US008254915B2

(12) United States Patent
Kozisek

(10) Patent No.: US 8,254,915 B2
(45) Date of Patent: *Aug. 28, 2012

(54) SYSTEM AND METHOD FOR ENABLING SUBSCRIBERS OF A COMMUNICATIONS CARRIER TO ACCESS A NETWORK OF OTHER SUBSCRIBERS

(75) Inventor: Steven E. Kozisek, Leawood, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 902 days.

This patent is subject to a terminal disclaimer.

(21) Appl. No.: 11/787,552

(22) Filed: Apr. 17, 2007

(65) Prior Publication Data
US 2008/0259851 A1 Oct. 23, 2008

(51) Int. Cl.
H04W 4/00 (2009.01)
(52) U.S. Cl. ............... 455/432.1; 455/435.1; 455/435.2; 455/410; 709/218
(58) Field of Classification Search .................. 455/403, 455/410–411, 412.1, 414.11–414.2, 432.1, 455/432.3, 433, 435.1, 435.2, 517; 370/328, 370/338; 709/216–219
See application file for complete search history.

(56) References Cited

U.S. PATENT DOCUMENTS

| 5,943,619 | A  | * | 8/1999  | Coyne et al.     | 455/433    |
| 7,444,669 | B1 | * | 10/2008 | Bahl et al.      | 726/3      |
| 2002/0102973 | A1 | * | 8/2002  | Rosenberg     | 455/432    |
| 2002/0191763 | A1 | * | 12/2002 | Bates et al.   | 379/144.01 |
| 2005/0154787 | A1 | * | 7/2005  | Cochran et al. | 709/219    |
| 2005/0208950 | A1 | * | 9/2005  | Hasse           | 455/453    |
| 2005/0282523 | A1 | * | 12/2005 | Yoshihara et al. | 455/411  |
| 2006/0021022 | A1 | * | 1/2006  | Krishna et al.  | 726/13     |
| 2006/0064497 | A1 | * | 3/2006  | Bejerano et al. | 709/228    |
| 2006/0133330 | A1 | * | 6/2006  | Chin            | 370/338    |
| 2006/0146752 | A1 | * | 7/2006  | Jang et al.     | 370/331    |
| 2007/0112948 | A1 | * | 5/2007  | Uhlik           | 709/223    |
| 2007/0288554 | A1 | * | 12/2007 | Komlenic et al. | 709/203    |

OTHER PUBLICATIONS

Amendment filed Feb. 23, 2010 in Response to Non-Final Action date mailed Jan. 4, 2010 in U.S. Appl. No. 11/787,551.
Notice of Allowance date mailed Feb. 2, 2010 in U.S Appl. No. 11/787,553.
RCE/Amendment filed Feb. 13, 2010 in U.S. Appl. No. 11/787,553.
Restriction Requirement date mailed Nov. 3, 2009 in U.S. Appl. No. 11/787,551.

(Continued)

Primary Examiner — Erika Gary
Assistant Examiner — Marisol Fahnert
(74) Attorney, Agent, or Firm — Patton Boggs, LLP

(57) ABSTRACT

A system and method for enabling subscribers of a communications carrier to communicate over a network of wireless access points of other consumer subscribers of the communications carrier is provided. In response to a wireless device of a user attempting to access a wireless access point of a subscriber, a database may be queried to determine whether the user of the wireless device is a subscriber of the communications carrier and has a subscription agreement enabling the subscriber to access a communications network via the network of wireless access points of other consumer subscribers. The subscriber may be enabled to access the wireless access point within the network of wireless access points in response to determining that the subscriber has a subscription agreement enabling communication over the communications network via the network of wireless access points of other consumer subscribers.

20 Claims, 4 Drawing Sheets

OTHER PUBLICATIONS

Response filed Nov. 24, 2009 to Restriction Requirement date mailed Nov. 3, 2009 in U.S. Appl. No. 11/787,551.

Non-Final Rejection date mailed Jan. 4, 2010 in U.S. Appl. No. 11/787,551.

"Supernode100—Resource Aggregator," Mushroom Networks, Inc., 2004-2006; retrieved from the Internet at URL: <http://www.mushroomnetworks.com/v7/supernode100.htm> on Feb. 1, 2007 (original publication date unknown) (2 pages).

"BPX100—Remote Management Suite," Mushroom Networks, Inc. 2004-2006; retrieved from the Internet at URL: <http://www.mushroomnetworks.com/v7/bpx100.htm> on Feb. 1, 2007 (original publication date unknown) (2 pages).

"CPX100—for Local Exchange Carrier Deployments," Mushroom Networks, Inc. 2004-2006; retrieved from the Internet at URL: <http://www.mushroomnetworks.com/v7/cpx100.htm> on Feb. 1, 2007 (original publication date unknown) (2 pages).

"APX10—for Access Point Aggregator," Mushroom Networks, Inc. 2004-2006; retrieved from the Internet at URL: <http://www.mushroomnetworks.com/v7/apx10.htm> on Feb. 1, 2007 (original publication date unknown) (2 pages).

"What's FON," FON Community; retrieved from the Internet at URL: <http://en.fon.com/info/whats_fon.php> on Feb. 1, 2007 (original publicaiton date unknown) (3 pages).

Notice of Allowance date mailed Apr. 21, 2010 in U.S. Appl. No. 11/787,553.

\* cited by examiner

SYSTEM AND METHOD FOR ENABLING SUBSCRIBERS OF A COMMUNICATIONS CARRIER TO ACCESS A NETWORK OF OTHER SUBSCRIBERS

BACKGROUND

Wireless communications have become pervasive in recent years. At first, telecommunications provided cordless handsets to enable consumers to use a home telephone without being restricted by a telephone cord. Mobile telephones further provided freedom to consumers by enabling them to use a telephone while away home. Finally, computers that were once attached to a wall socket to communicate over the Internet became wireless through the use of wireless routers and other wireless access points.

Mobility further expanded by commercial wireless access points becoming available and proliferating throughout society. Broadband wireless access points have become available at coffee shops, airports, hotels, and other commercial locations. These commercial wireless access points have become available for a number of reasons, including attracting computer users who enjoy accessing the Internet and generating network access fees. Commercial access points are provided by a commercial establishment becoming a reseller of network access. For example, Starbucks® coffee shops are resellers of T-Mobile® communications services. Each of these commercial companies financially benefit when users access the T-Mobile® communications network via the wireless access points within Starbucks®.

One situation that has developed by wireless routers becoming so pervasive is non-subscribers accessing wireless routers and network services being paid by their consumer subscriber neighbors. This situation arises when a consumer subscriber does not password protect access to the wireless router. In the case of a non-subscriber's unauthorized access of a subscriber's wireless router, this act is considered theft of wireless communications services. In the case where the subscriber knowingly allows for non-subscribers to access the wireless router, such an act is generally prohibited by terms and conditions of consumer service agreements between the service provider and the consumer subscriber.

Another situation that has developed is one where a third-patty, non-communications carrier sells wireless routers that are connected to network connections of subscribers of communications carriers. The third-party, non-communications carrier sells subscription agreements to customers to access a network via these wireless routers. The customers of the third-party, non-communications carrier are able to connect to the network via the wireless routers without having to pay the communications carriers, thereby saving money. However, such configurations and subscription agreements are against the terms and conditions of subscription agreements of the subscribers of the communications carriers because, in effect, those subscribers providing access to non-subscribers are operating as resellers of network access. In some cases, the subscribers that provide access to non-subscribers are paid by the third-party, non-communications carrier to provide access to subscribers of the third-party, non-communications carrier network.

While wireless routers have enabled computer users to access the Internet with unprecedented freedom, bandwidth of these routers are relatively slow. Today's technology provides users with 50 megabit (MB) per second communications. However, these speeds are relatively slow when downloading large amounts of content, such as a movie.

A number of third-party bandwidth expansion products have been developed to increase bandwidth to those who purchase these bandwidth expansion products. One such product provides a subscriber with a device to aggregate bandwidth from local wireless routers. Essentially, communication with each local wireless router is performed in parallel. However, the act of bandwidth pooling by consumer non-resellers is also considered a violation of the terms and conditions of a communications carrier's subscription agreement because non-subscribers or users other than the subscriber who owns the wireless router are provided access to the wireless routers and telecommunications services without paying a telecommunications carrier for that access or expanded access.

SUMMARY

To overcome the problem of subscribers of a communications carrier to have access to a communications network provided by the communications carrier, the communications carrier may provide a subscription agreement having terms and conditions that enable consumer subscribers to access the communications network via a network of wireless access points of other consumer subscribers. This subscription agreement provides for intra-network roaming of the communications carrier.

One embodiment for enabling subscribers of a communications carrier to communicate over wireless access points of other consumer subscribers of the communications carrier includes a system including a storage unit configured to store at least one database including information identifying consumer subscribers and associated subscriber subscription agreements provided by a communications carrier. The system may include a network of wireless access points associated with the consumer subscribers of the communications carrier. At least one of the subscription agreements may enable consumer subscribers to access wireless access points of other consumer subscribers of the communications carrier to communicate over a communications network A computing system may be in communication with the storage unit and the network of wireless access points of the consumer subscribers, where the computing system may be configured to (i) receive a request signal from a wireless device of a user via a wireless access point of a consumer subscriber of the communications carrier to communicate over the communications network (ii) query the database(s) stored in the storage unit to determine whether the user is a subscriber of the communications carrier and has a subscription agreement enabling the subscriber to communicate over the communications network via the network of wireless access points of other consumer subscribers, and (iii) enable the wireless device to access the wireless access point in response to determining that the subscriber has a subscription agreement enabling the subscriber to communicate over the communications network via the network of wireless access points of other consumer subscribers.

An embodiment for enabling subscribers of a communications carrier to communicate over wireless access points of other consumer subscribers of the communications carrier may include a process for receiving a request signal from a wireless device of a user via a wireless access point of a consumer subscriber of a communications carrier to communicate over a communications network A database may be queried to determine whether the user is a subscriber of the communications carrier and has a subscription agreement enabling the subscriber to communicate over the communications network via the network of wireless access points of other consumer subscribers. The wireless device may be enabled to access the wireless access point within the network of wireless access points in response to determining that the subscriber has a subscription agreement enabling the subscriber to communicate over the communications network via the network of wireless access points of other consumer subscribers.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
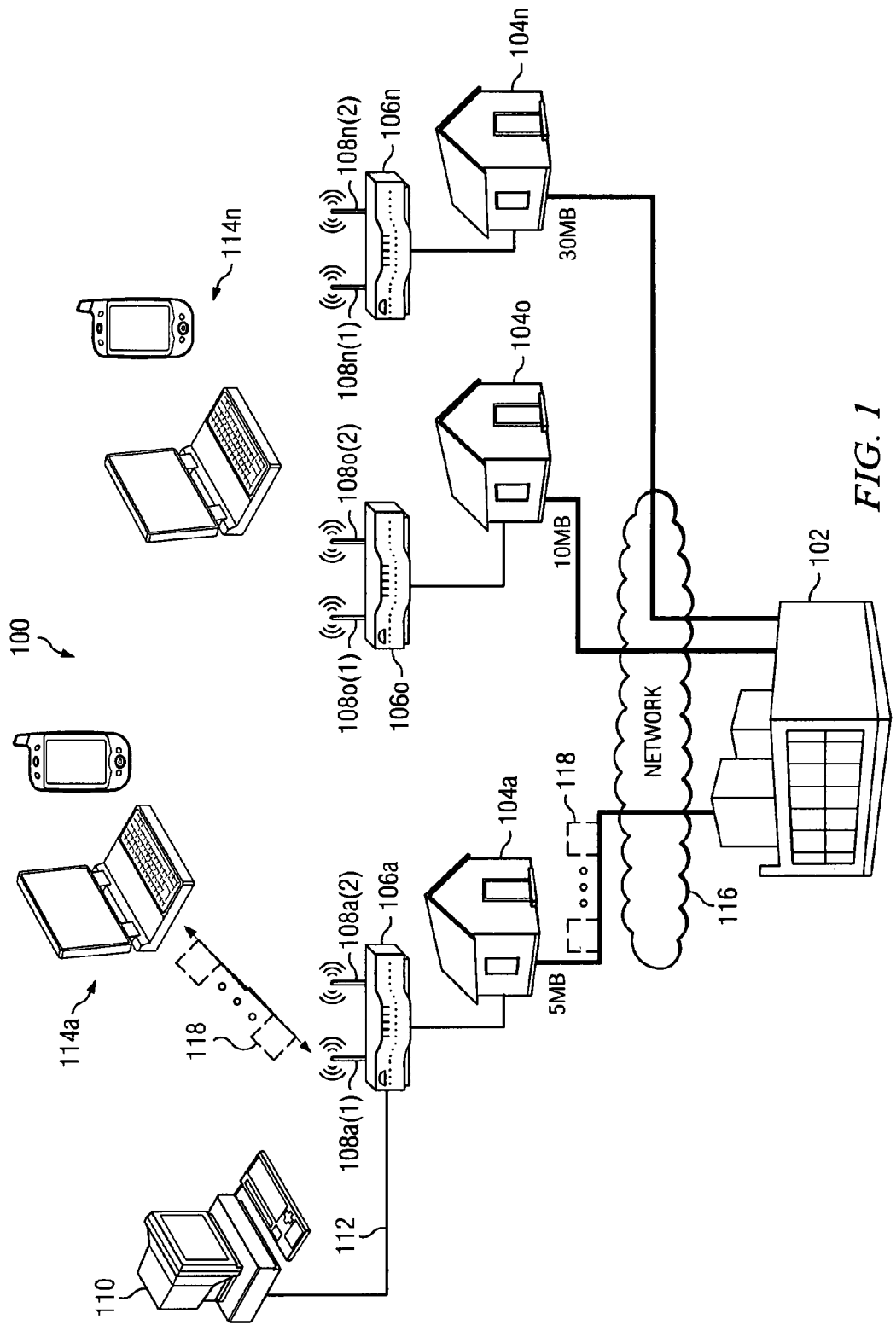
FIG. 1 is an illustration of a system for a communications carrier to provide wireless communications services to consumer subscribers.

FIG. 1 is an illustration of a system 100 of a communications carrier 102 for providing wireless network communications services to consumer subscribers at residential locations 104a-104n. The subscribers may access the wireless communications services at the residential locations 104a-104n (collectively 104), such as a house, via wireless access points 106a-106n (collectively 106). The wireless communications services may be in the form of broadband or other communications protocols. The wireless access points 106 may be wireless routers or any other wireless access points that enables users to have wireless access to a communications network A wireless access point 106a may include multiple antennas 108a(1)-108a(2) (collectively 108a) that are utilized to communicate with a user within the residential location 104a and user outside of the residential location 104a. A communications path (not shown), including a transceiver and other communications devices as understood in the art, may be included within the wireless access point 106a for communicating via each antenna 108a(1) and 108a(2). In one embodiment, the wireless access point 106a may communicate with a personal computer 110 or other device over a cable 112 using an Ethernet communications protocol or other communications protocol. In addition, a user may communicate with the wireless access point 106a using a wireless device 114a, such as a personal computer, mobile telephone, or other wireless device for communicating over a communications network 116 (e.g., the Internet).

In communicating with the wireless access point 106a, the wireless device 114a may wirelessly communicate using data packets 118 using a wireless communications protocol, such as WiFi, WiMax, or any other wireless communications protocol for communicating voice and/or data over the network 116. The data packets 118 may be communicated via the wireless access point 106a and over the network 116.

In accordance with the principles of the present invention, a network of wireless access points 106 is formed by the consumer subscribers having wireless access points being served by the communications carrier. The subscribers of the communications carrier may have a subscription agreement that provides for wireless access to wireless access points of other consumer subscribers of the communications carrier and allows for other consumer subscribers to access their respective wireless access points ("intra-network roaming" subscription agreement). For example, a consumer subscriber having an intra-network roaming subscription agreement with the communications carrier 102 enables the consumer subscriber using the wireless device 114a to access wireless access points 106o or 106n of other consumer subscribers to communicate over the communications network 116.

In accordance with the principles of the present invention, the wireless access points 106 may have a private communications interface and a public wireless communications interface. In one embodiment, each of the private and public wireless communications interfaces may be in communication with respective antennas 108a(1) and 108a(2). Alternatively, both may be in communication with a single antenna 108a(1). The private wireless communications interface may be one that a subscriber at the residential location 104a may access, but no others subscribers may access. The public wireless communications interface may be an interface that both the subscriber located at the residential location 104a may use and a subscriber other than one located at the residential location 104a may utilize. In other words, subscribers having an intra-network roaming subscription agreement may access any of the wireless access points 106 that are within communication range of their respective wireless devices. Of course, a subscriber who owns the wireless access point 106a may be given priority over other subscribers accessing their wireless access points. For example, if the subscriber who owns the wireless access point 106a decides to download a movie from the network 116, that movie download would be given priority over other subscribers who are accessing the wireless access point 106a.

In one embodiment, the communications carrier 102 provides a subscription agreement that allows for consumer subscribers to aggregate bandwidth from multiples wireless access points 106. In this case, if a wireless device, such as wireless device 114n operated by a subscriber who has a subscription agreement that enables bandwidth aggregation, is within range of multiple wireless access points 106o and 106n, then the wireless device 114n may use unused bandwidth from the wireless access points 106o and 106n.

As shown, each of the residential locations is provided a certain bandwidth. More specifically, residential location 104a receives a 5 MB bandwidth, residential location 104o receives a 10 MB bandwidth, and residential location 104n receives a 30 MB bandwidth. These bandwidths are paid for by each of the respective subscribers, where the subscriber at residential location 104a may pay less for a 5 MB bandwidth than a subscriber at residential location 104n with a 30 MB bandwidth. If the subscriber at residential location 104a is within wireless communication range of the wireless access point 106o, the aggregated wireless communications for the subscriber at residential location 104a is potentially a 15 MB bandwidth (i.e., the sum of the 5 MB and 10 MB bandwidths) while communicating with both the wireless access points 106a and 106o. If the subscriber at residential 104o is in wireless communication range of wireless access points 106a and 106n, then the subscriber may have 45 MB bandwidth (i.e., the sum of the 5 MB, 10 MB, and 30 MB bandwidth), and if the subscriber at residential location 104n is in wireless communication range of the wireless access point 106o, then the subscriber at residential location 104n has a 40 MB bandwidth (i.e., the sum of the 10 MB and 30 MB bandwidth) while communicating with both wireless access points 106o and 106n.

Figure 2:
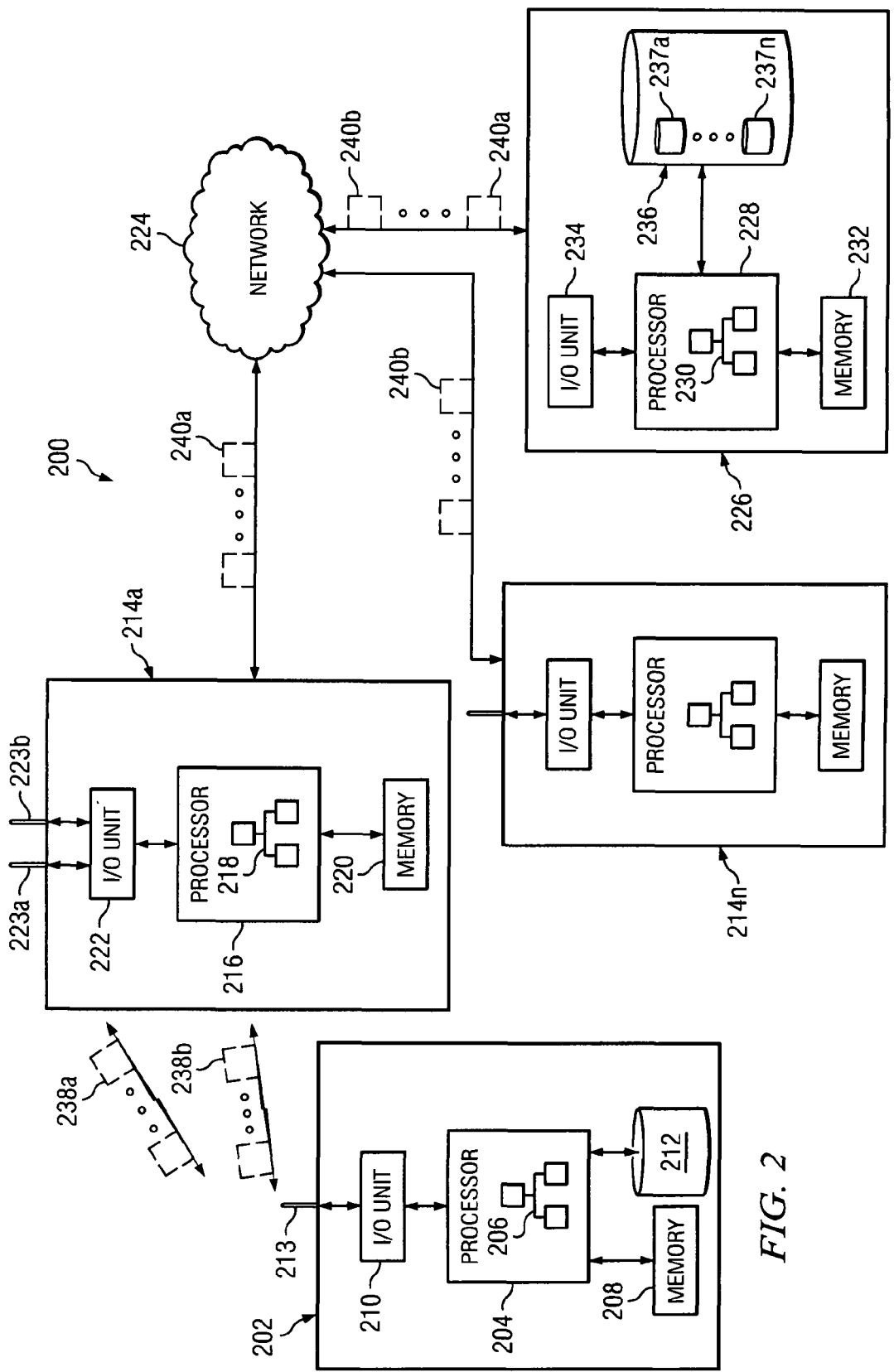
FIG. 2 is an illustration of a system showing components within the system for consumer subscribers to access a communications network via wireless access points of other consumer subscribers of the communications carrier.

FIG. 2 illustration of a system 200 showing components within the system for consumer subscribers to access a communications network via wireless access points other consumer subscribers of the communications carrier. Additionally, the system 200 may be configured to provide subscribers with aggregated wireless communications. The system 200 may include wireless device 202 used by a subscriber that may be a personal computer, laptop computer, telephone, game, or any other device that may utilize wireless communications. The wireless device 202 may include a processor 204 that executes software 206 that is utilized for providing functionality for the user of the wireless device 202 and provides wireless communications to enable the user to communicate with remote locations. The processor 204 may be in communication with a memory 208 that is used for storing data and executable software, input/output (I/O) unit 210 that performs communications with remote locations, and storage unit 212 that may store data for the wireless device 202. An antenna 213 may be in communication with the I/O unit 210 for performing wireless communications to remote devices.

A wireless access point 214a may include a processor 216 that executes software 218. The software 218 may provide for both private and public wireless interface communications. The processor 216 may be in communication with memory 220 and I/O unit 222. Antennas 223a and 223b may be in communication with the I/O unit 222 for providing both private and public wireless communications services to subscribers within range of the wireless access point 214a. The software 218 may be configured to enable owners of the wireless access point 214a to have unrestricted access to the wireless access point 214a and have priority for wireless communications with the wireless access point 214a over non-owners (i.e., other subscribers who are using the public wireless communications interface to access a network or to aggregate wireless communications bandwidth) accessing the wireless access point 214a. The wireless access point 214a may be in communication with a communications network 224, such as a telecommunications network Internet, or other communications network. In one embodiment, the network 224 is a public switched telephone network (PSTN).

A server 226, which may be operated by a communications carrier or other service provider, may include a processor 228 that executes software 230. The processor 228 may be in communication with memory 232, I/O unit 234, and storage unit 236. Data repositories 237a-237n (collectively 237) may be stored on the storage unit 236 and be utilized to store subscriber information of the service provider. The data repositories 237 may include one or more databases. In one embodiment, data stored in the data repositories 237 include information about subscribers who have subscription agreements that provide for intra-network roaming wireless access of a communications network via wireless access points of other subscribers. In another embodiment, the subscribers may have a subscription agreement to receive aggregated wireless communications services, such that the subscribers, in addition to being able to access other subscribers' wireless access points, may also simultaneously access multiple wireless access points 214a-214n to receive increased wireless communications bandwidth.

The software 230 may be configured to determine when a wireless device is attempting to access a wireless access point 214a to determine whether the wireless device is owned by the owner of the wireless access point. In the case of the wireless access point 214a having a private and public wireless communications interface, the determination may be made to determine whether the wireless device is attempting to access the private or public wireless communications interface. This determination may be made in conjunction with software executing on the wireless access point 214a. For example, software being executed by the wireless access point 214a may (i) receive a signal, including information representative of a wireless device (e.g., device number or IP address), from a wireless device attempting to communicate with the wireless access point 214a and (ii) communicate the signal to the server 226 for the software 230 to compare the information representative of the wireless device with the information stored in the data repositories 237 to determine whether the wireless device is communicating with a home wireless access point or a wireless access point of another subscriber of the communications carrier. If the wireless device is not owned by the owner of the wireless access point 214a, then a determination may be made as to whether the user has a subscription agreement that enables him or her to access the network of wireless access points of subscribers of the communications carrier. If it is determined that the user is a subscriber of the communications carrier that enables intra-network roaming, then a determination may be made as to whether the subscriber has a subscription agreement that provides for aggregated wireless communications services. If the user is not a subscriber of intra-network roaming or aggregated wireless communications services, then the software 206 and/or 230 may intercept and prevent such unauthorized access and enable the user to pay for limited access (see, FIGS. 4 and 5).

Figure 3:
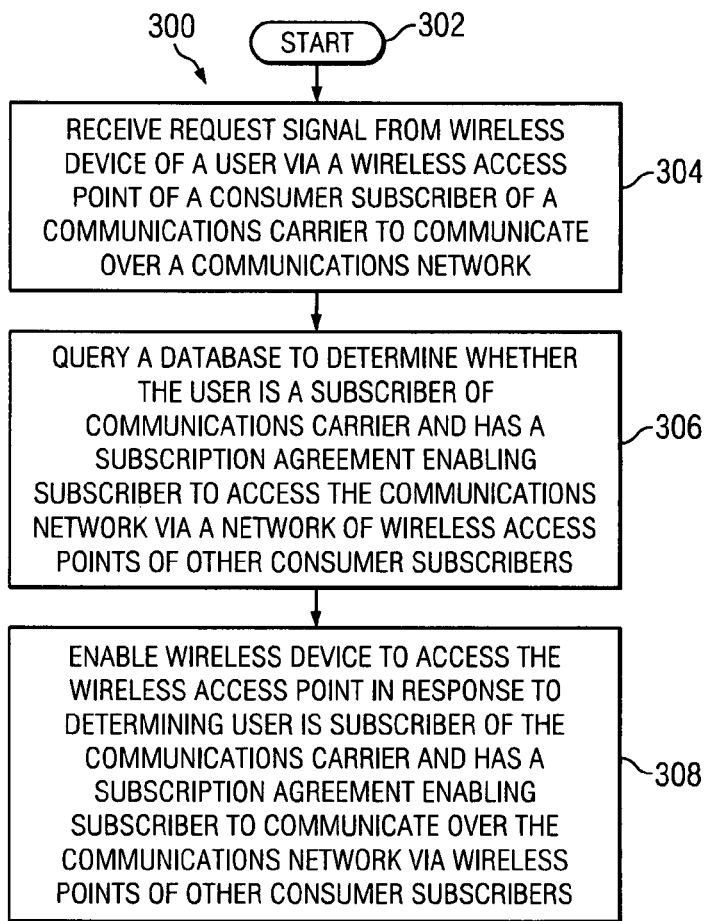
FIG. 3 is a flow diagram of an exemplary process for determining that a consumer subscriber is a subscriber with rights to roam within the network of wireless access points of a communications carrier and connect to a wireless access point of another consumer subscriber of the communications carrier.

FIG. 3 is a flow diagram of an exemplary process 300 for determining that a consumer subscriber is a subscriber with rights to roam within a network of wireless access points of a communications carrier and connect to a wireless access point of another consumer subscriber of the communications carrier. The process 300 starts at step 302. At step 304, a request is received from a wireless device of a user via a wireless access point of another consumer subscriber within a network of wireless access points associated with consumer subscribers of a communications carrier. Optionally, a determination that the wireless device of the subscriber is accessing a wireless access point of another consumer subscriber within the network of wireless access points may be made. At step 306, a database is queried to determine whether the user is a subscriber of the communications carrier and has a subscription agreement enabling the subscriber to access the network of wireless access points of other consumer subscribers. The wireless device is enabled to access the wireless access point within the network of wireless access points in response to determining that the subscriber has a subscription agreement with the communications carrier enabling access to the network of wireless access points of other consumer subscribers at step 308. Being able to access a wireless access point within a network of wireless access points of other subscribers, in essence, allows the consumer subscriber to roam within the network of wireless access points hosted by the communications carrier. The process ends at step 310.

Figure 4:
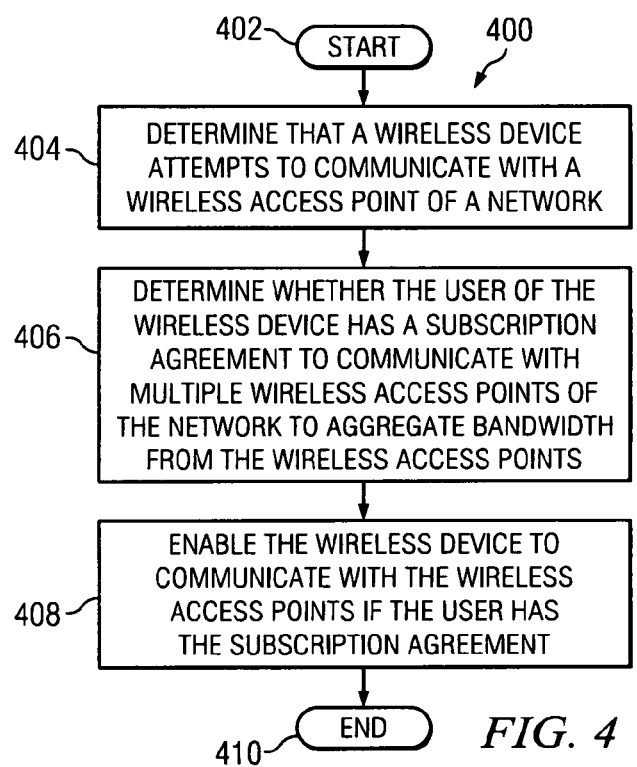
FIG. 4 is a flow diagram of an exemplary process for determining that a user is a subscriber of aggregated wireless communications services.

FIG. 4 is a flow diagram of an exemplary process 400 for determining that a user is a subscriber of aggregated wireless communications services. The process 400 starts at step 402. At step 404, a determination is made that a wireless device attempts to communicate with a wireless access point of a network of wireless access points of other subscribers of the communications carrier. At step 406, a determination is made as to whether the user of the wireless device has a subscription agreement to communicate with multiple wireless access points of the network of wireless access points of the communications carrier to aggregate bandwidth from the wireless access points. At step 408, the wireless device is enabled to communicate with the wireless access points if the user has the subscription agreement allowing for aggregated wireless communication services. The process may be implemented using software and/or hardware of a communications carrier. The process ends at step 410.

Figure 5:
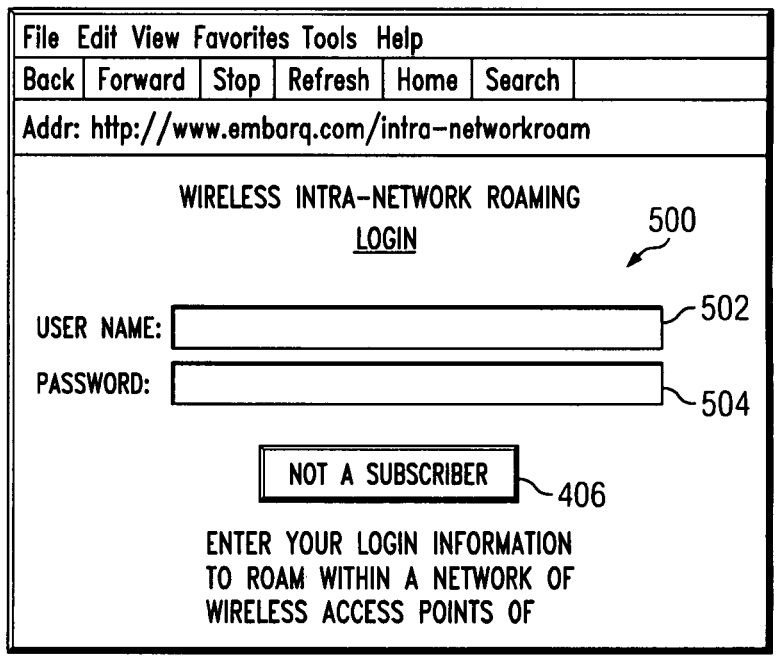
FIG. 5 is a screen shot of an exemplary log-in webpage for a consumer subscriber to access a wireless access point of another subscriber within a network of wireless access points of a communications carrier.
Figure 6:
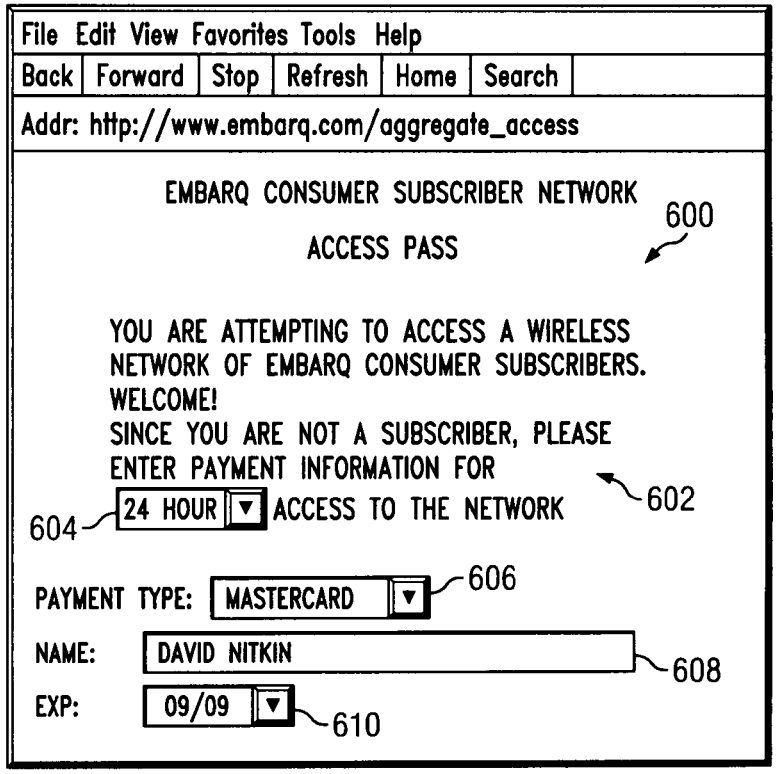
FIG. 6 is a screen shot of an exemplary webpage for enabling a non-subscriber user to temporarily pay for network communications services via a consumer subscriber wireless access point.

FIG. 5 is a screen shot of an exemplary log-in webpage 500 for a consumer subscriber to access a wireless access point of another subscriber within a network of wireless access points of a communications carrier. The webpage 500 may be generated and prompted to a user of a wireless device in response to a wireless device of the consumer subscriber attempting to access a wireless access point of the network of wireless access points. The webpage 500 may request user name and password input fields 502 and 504, respectively. If the user is not a subscriber of intra-network roaming of the communications carrier, then the user may select a soft-button 506 indicating that he or she is not a subscriber. In response, the user may be provided another webpage (FIG. 6) to receive an access pass to temporarily access the network. It should be understood that the user may set up automatic login parameters that are requested by a wireless access device of the network to determine whether the subscriber is a subscriber with an intra-network roaming subscription agreement. By setting up the automatic login parameters, the user may avoid having to go through the log-in webpage 500, thereby making the user's experience seamless within the network of consumer subscribers of the communications carrier. It should be understood that interfaces other than Web pages may be utilized to input, store and deliver authentication information from the electronic device to the network so that future access to the network(s) is seamlessly enabled for the user. Interfaces may include software applications or hardware devices that uniquely identify the user and allow authentication and access to the network FIG. 6 is a screen shot of an exemplary webpage 600 for enabling a user who is not a subscriber to temporarily pay for communications services via a wireless access point of a subscriber of a communications carrier. The webpage 600 may provide a message 602 that notifies the user that he or she is attempting to access the consumer subscriber network of the communications carrier and that he or she is not a subscriber. The user may select a time period in a selectable element 604 that he or she wishes to have access to the wireless aggregation network. The user may enter payment type (e.g., credit card) in a selectable element 606, such as a pull-down menu, name in a text entry field 608, and expiration date of the payment type in a selectable element 510. Software at a central location (e.g., software 230 executing on server 226 of FIG. 2) may store the user's information and enable the user utilizing a wireless device to have access to the consumer subscriber network for the selected time period. At the end of the time period, the user may be prompted with another webpage that allows the user to extend the time period or become a subscriber of the consumer subscriber network. It should be understood that similar interfaces may be provided to the user if aggregate wireless communications are available to the user. In other words, a webpage may enable a consumer subscriber and/or non-subscriber to use aggregate wireless communications, if the user has not previously established parameters on his or her wireless device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for enabling subscribers of a communications carrier to communicate over wireless access points of other residential consumer subscribers of the communications carrier, said system comprising:
   a storage unit configured to store at least one database including information identifying residential consumer subscribers and associated subscriber subscription agreements provided by a communications carrier,
   a network of wireless access points associated with the residential consumer subscribers of the communications carrier, at least one of the subscription agreements enabling residential consumer subscribers to access wireless access points of other residential consumer subscribers of the communications carrier to communicate over a communications network; and
   a computing system in communication with said storage unit and the network of wireless access points of the residential consumer subscribers, said computing system configured to:
   receive a request signal from a wireless device of a user via a wireless access point of a residential consumer subscriber of the communications carrier to communicate over the communications network;
   query the at least one database stored in said storage unit to determine whether the user of the wireless device is a subscriber of the communications carrier and has a subscription agreement enabling the subscriber to communicate over the communications network via the network of wireless access points of other residential consumer subscribers; and
   enable the wireless device to access the wireless access point in response to determining that the user is a subscriber of the communications carrier and has a subscription agreement enabling the subscriber to communicate over the communications network via the network of wireless access points of other residential consumer subscribers.

2. The system according to claim 1, wherein the wireless access points include broadband wireless routers, and wherein the wireless device is automatically enabled in response to receiving automatic login parameters from the wireless device.

3. The system according to claim 1, wherein said computing system is further configured to query the wireless device for a user ID and a password.

4. The system according to claim 3, wherein said computing system is further configured to query the at least one database to determine whether the user ID and password are stored in the at least one database and related to a subscriber having a subscription agreement enabling access to the communications network via wireless access points of other subscribers.

5. The system according to claim 1, wherein said system is further configured to determine whether a user of the wireless device has a subscription agreement to communicate with multiple wireless access points to aggregate bandwidth therefrom.

6. The system according to claim 1, wherein the wireless device is a personal computer.

7. The system according to claim 1, wherein the wireless device has priority when communicating with a home wireless access point of the residential consumer subscriber over wireless devices of other residential consumer subscribers communicating with the home wireless access point of the subscriber.

8. The system according to claim 1, wherein the wireless access points are configured with a private communications interface and a public communications interface, the wireless device communicating with the public communications interface of at least one of the wireless access points.

9. The system according to claim 1, wherein said computing system is further configured to:
    determine that a second signal received from a second wireless device is not from a subscriber of the communications carrier, and
    query the wireless device to determine whether user input from a second user of the second wireless device is received indicating acceptance of an access fee for communicating with the wireless access point of the residential consumer subscriber.

10. The system according to claim 9, wherein said computing system is further configured to provide access to the communications network via said network of wireless access points for a duration of time selected by the second user.

11. A method for enabling subscribers of a communications carrier to communicate over wireless access points of other residential consumer subscribers of the communications carrier, said method comprising:
    receiving a request signal from a wireless device of a user via a wireless access point of a residential consumer subscriber of a communications carrier to communicate over a communications network;
    querying a database to determine whether the user of the wireless device is a subscriber of the communications carrier and has a subscription agreement enabling the subscriber to access the communications network via a network of wireless access points of other residential consumer subscribers; and
    enabling the wireless device to access the wireless access point in response to determining that the user is a subscriber of the communications carrier and has a subscription agreement enabling the subscriber to communicate over the communications network via wireless access points of other residential consumer subscribers.

12. The method according to claim 11, further comprising receiving a request signal from a wireless device via a wireless access point includes receiving a broadband signal.

13. The method according to claim 11, further comprising querying the wireless device to determine a user ID and password of the subscriber.

14. The method according to claim 13, further comprising querying the database to determine whether the user ID and password are stored in the database and related to a subscriber having a subscription agreement enabling access to the communications network via wireless access points of other subscribers.

15. The method according to claim 11, further comprising determining whether the subscriber of the wireless device has a subscription agreement to communicate with multiple wireless access points to aggregate bandwidth therefrom.

16. The method according to claim 11, further comprising prioritizing communications of the wireless device when communicating with a home wireless access point of the subscriber over other wireless devices communicating with the home wireless access point of the subscriber.

17. The method according to claim 11, further comprising receiving communications from the wireless device from a public communications interface of at least one of the wireless access points of the residential consumer subscribers having a private communications interface and a public communications interface.

18. The method according to claim 11, further comprising:
    determining that a second signal received from a second wireless device is not from a subscriber of the communications carrier, and
    querying the wireless device to determine whether user input from a user of the second wireless device is received indicating acceptance of an access fee for communicating over the communications network via the network of wireless access points of residential consumer subscribers of the communications carrier.

19. The method according to claim 18, wherein the user input comprises selection of a time period during which access to the communications network is to be provided to the user.

20. A method for enabling subscribers of a communications carrier to communicate over wireless access points of other residential consumer subscribers of the communications carrier, the method comprising:
    receiving a request signal from a wireless device of a user via a wireless access point of a residential consumer subscriber of a communications carrier to communicate over a communications network;
    querying a database to determine (1) whether the user of the wireless device is a subscriber of the communications carrier and has a subscription agreement enabling the subscriber to access the communications network via a network of wireless access points of other residential consumer subscribers and (2) whether the subscriber of the wireless device has a subscription agreement to communicate with multiple wireless access points to aggregate bandwidth therefrom;
    automatically enabling the wireless device to access the wireless access point in response to (1) determining that the user is a subscriber of the communications carrier, (2) has a subscription agreement enabling the subscriber to communicate over the communications network via wireless access points of other residential consumer subscribers, and (3) receiving automatic login parameters; and
    enabling the wireless device to aggregate bandwidth from the multiple wireless access points in response to determining the wireless device has a subscription agreement to communicate with multiple wireless access points.

\* \* \* \* \*